US012738163B2

(12) United States Patent
Ishigooka et al.

(10) Patent No.: US 12,738,163 B2
(45) Date of Patent: Sep. 15, 2026

(54) TRAFFIC CONTROL SYSTEM AND TRAFFIC CONTROL METHOD

(71) Applicant: Hitachi, Ltd., Tokyo (JP)

(72) Inventors: Tasuku Ishigooka, Tokyo (JP); Satoshi Otsuka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 344 days.

(21) Appl. No.: 18/020,203

(22) PCT Filed: Apr. 20, 2021

(86) PCT No.: PCT/JP2021/015995
§ 371 (c)(1),
(2) Date: Feb. 7, 2023

(87) PCT Pub. No.: WO2022/059243
PCT Pub. Date: Mar. 24, 2022

(65) Prior Publication Data

US 2023/0267837 A1 Aug. 24, 2023

(30) Foreign Application Priority Data

Sep. 18, 2020 (JP) ................................ 2020-157469

(51) Int. Cl.
*G08G 1/16* (2006.01)
*B60W 30/09* (2012.01)
(Continued)

(52) U.S. Cl.
CPC ............... *G08G 1/16* (2013.01); *B60W 30/09* (2013.01); *B60W 30/0953* (2013.01);
(Continued)

(58) Field of Classification Search
CPC ............ H04W 4/40; H04W 4/44; H04W 4/46
See application file for complete search history.

(56) References Cited

U.S. PATENT DOCUMENTS 10,126,423 B1 * 11/2018 Fowler .................. G01S 13/931
2002/0036584 A1 * 3/2002 Jocoy ..................... G08G 1/164
342/72

(Continued)

FOREIGN PATENT DOCUMENTS

JP 2008-90603 A 4/2008
JP 2015-219803 A 12/2015

(Continued)

OTHER PUBLICATIONS

International Search Report (PCT/ISA/210) issued in PCT Application No. PCT/JP2021/015995 dated Jul. 13, 2021 with English translation (five (5) pages).

(Continued)

*Primary Examiner* — Fadey S. Jabr
*Assistant Examiner* — Mario C Gonzalez
(74) *Attorney, Agent, or Firm* — Crowell & Moring LLP

(57) ABSTRACT

A traffic control system includes a mobile body, an infrastructure sensor that monitors the mobile body and a pedestrian within a field, and a safety monitoring device that communicates wirelessly with the mobile body. The safety monitoring device includes a rule violation detection unit that detects, based on output from the infrastructure sensor, a rule violation by the mobile body or the pedestrian, and a safe action instruction unit that instructs the mobile body to execute a safe action or safe action preparation corresponding to the rule violation when the rule violation is detected. The mobile body includes a speed control unit that outputs a control command for decelerating the mobile body if the wireless communication speed thereof with the safety monitoring device is greater than or equal to a prescribed threshold to ensure safety even when a safety rule violation has occurred.

10 Claims, 17 Drawing Sheets

(51) Int. Cl.
*B60W 30/095* (2012.01)
*B60W 30/14* (2006.01)
*B60W 60/00* (2020.01)

(52) U.S. Cl.
CPC ...... *B60W 30/0956* (2013.01); *B60W 30/143* (2013.01); *B60W 60/0015* (2020.02); *B60W 2554/80* (2020.02)

(56) References Cited

U.S. PATENT DOCUMENTS

2002/0109611 A1* 8/2002 Howard ................ G07F 17/246 340/932.2
2011/0102195 A1* 5/2011 Kushi ............. G08G 1/096783 340/905
2013/0266188 A1* 10/2013 Bulan .................... G06V 20/52 382/104
2014/0314275 A1* 10/2014 Edmondson ........... G06V 20/54 382/103
2014/0324297 A1* 10/2014 Kim ...................... B60W 10/20 701/48
2015/0039156 A1* 2/2015 Shibata ..................... B60T 7/22 701/1
2015/0339534 A1 11/2015 Morikawa et al.
2016/0071417 A1* 3/2016 Lewis .................... G08G 1/162 701/301
2020/0314685 A1* 10/2020 Jornod .................. H04W 48/16
2021/0125496 A1* 4/2021 Jornod ................. G05D 1/0061
2022/0101725 A1* 3/2022 Kobayashi ............. G08G 1/052

FOREIGN PATENT DOCUMENTS

JP 2017-187856 A 10/2017
WO WO-2016125111 A1 * 8/2016 ............. G07C 5/008

OTHER PUBLICATIONS

Japanese-language Written Opinion (PCT/ISA/237) issued in PCT Application No. PCT/JP2021/015995 dated Jul. 13, 2021 (three (3) pages).

* cited by examiner

FIG. 9A
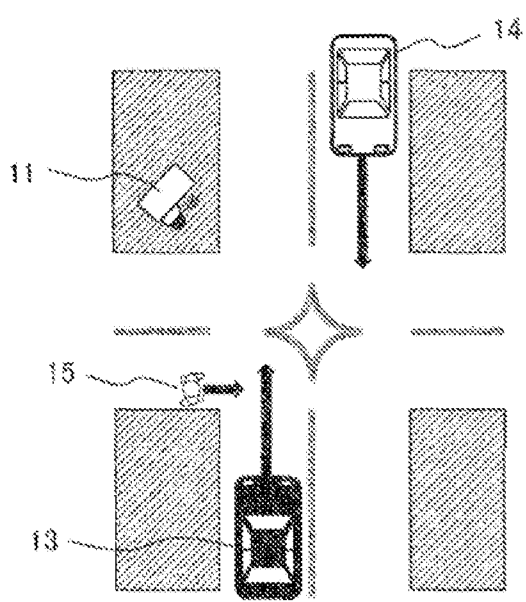
FIG. 9B
FIG. 9C
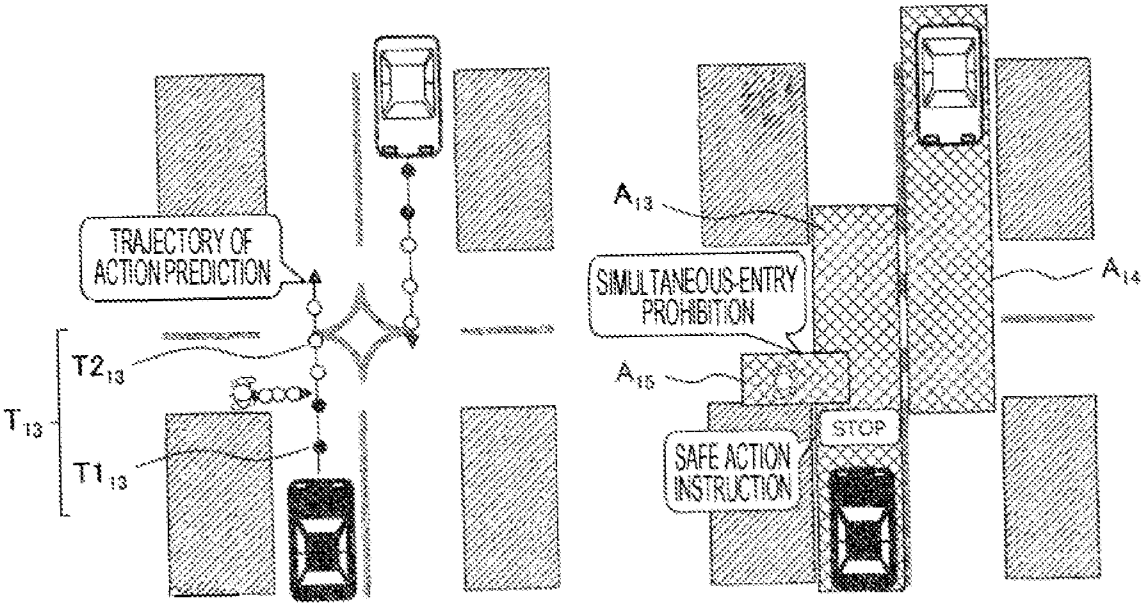

FIG. 11A
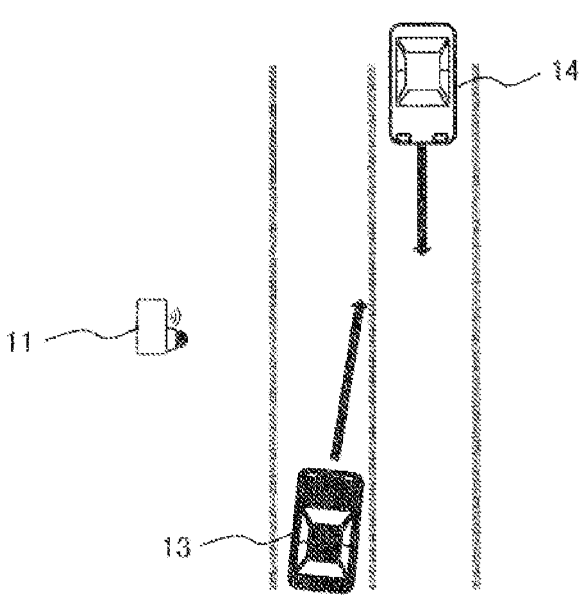
FIG. 11B
FIG. 11C
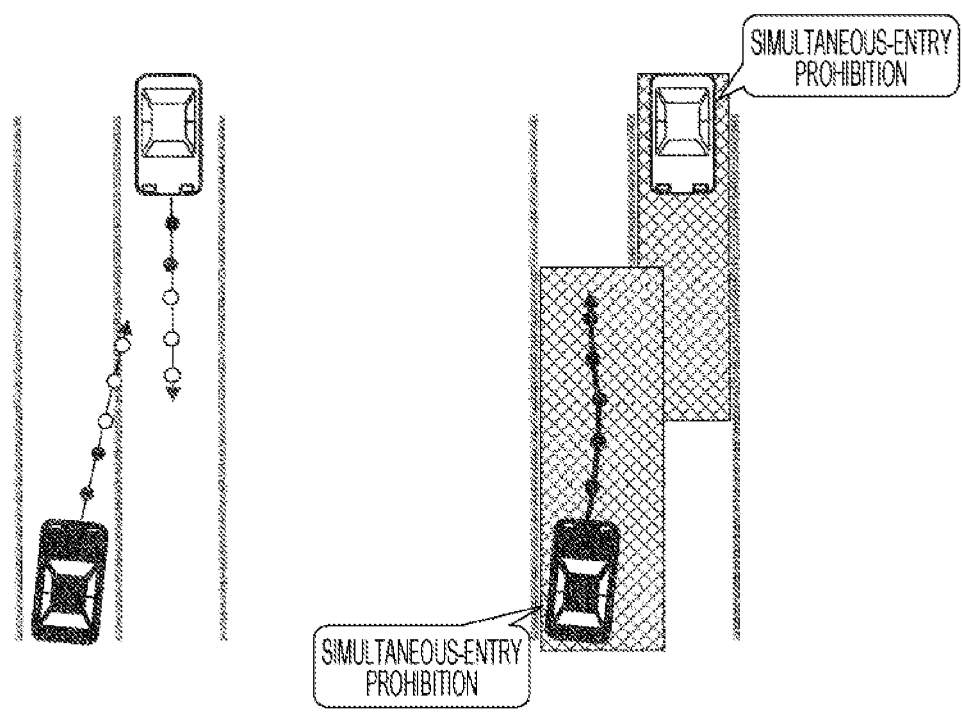

FIG. 12A
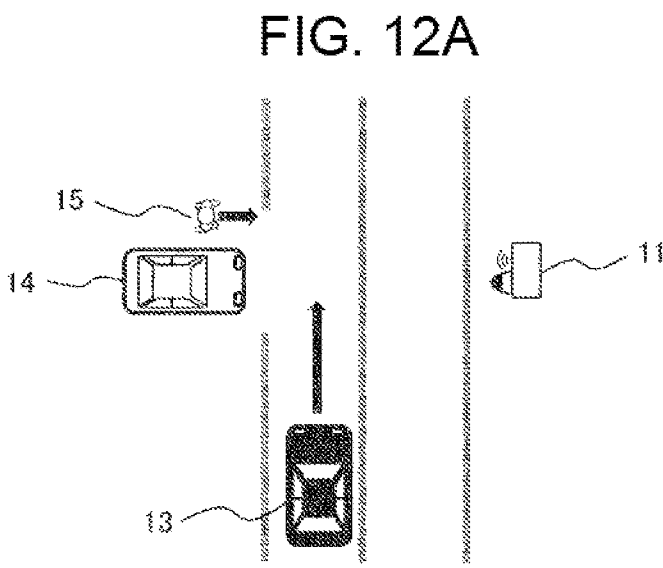
FIG. 12B
FIG. 12C
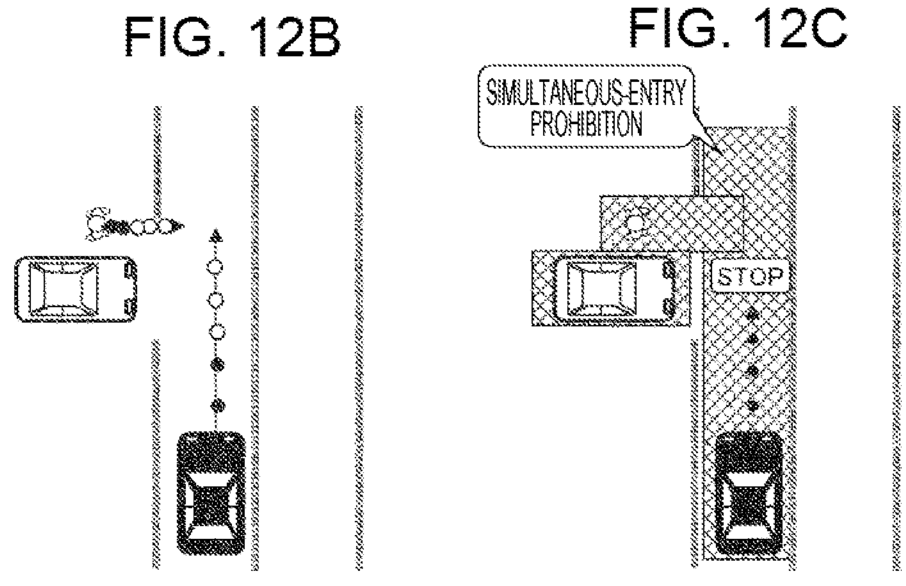

FIG. 13A
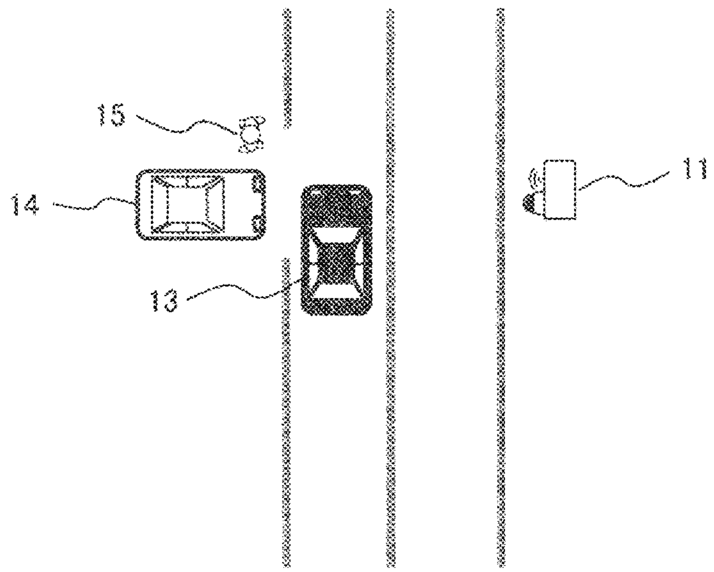
FIG. 13B
FIG. 13C
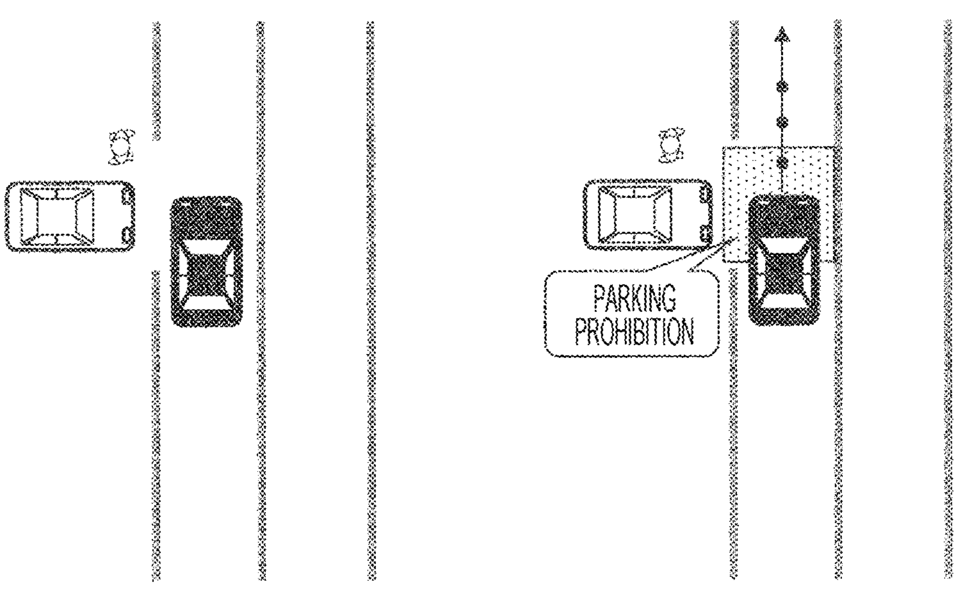

TRAFFIC CONTROL SYSTEM AND TRAFFIC CONTROL METHOD

TECHNICAL FIELD

The present invention relates to a traffic control system and a traffic control method for controlling traffic within a field to be monitored while communicating wirelessly with a mobile body moving within the field.

BACKGROUND ART

In recent years, control systems that provide an autonomous mobile service or an autonomous transport service within a limited area (field) are spreading. Examples thereof include a conveyance system by a vehicle in factory premises, a warehouse management system by an automatic forklift, an automated guided vehicle (AGV), or an AGV with a robot arm, a robot taxi or self-driving bus for a specific district, and a self-driving truck in a mine. In a field where these services are provided, mobile bodies that autonomously perform perception, judgment, and control (autonomous mobile bodies), mobile bodies that are operated by persons (manned mobile bodies), and persons including workers and outsiders coexist and perform their respective works.

In order to improve safety and efficiency, the field has traffic rules, work rules, safety rules, and the like established among the autonomous mobile bodies, the manned mobile bodies, and the persons. The autonomous mobile bodies optimally move and work according to these rules. However, there is concern that the manned mobile bodies and the persons might violate the rules, leading to a decrease in safety and efficiency. Therefore, a technique for preventing the decrease in safety and efficiency even when a manned mobile body or a person violates the rules is required.

For example, the abstract of PTL 1 describes that "a travel situation appropriateness determination device that determines whether or not a travel situation of a vehicle is appropriate in light of traffic rules reduces a burden of creating a traffic rule that will be obtained through a complicated procedure". It also describes that, as a solution for this, "a travel information appropriateness determination device 1 acquires place-related rule information in which a specific place on a road and a traffic rule are associated with each other. Then, on the basis of the acquired place-related rule information and information from a sensor group 3, it is determined whether or not a travel situation of a vehicle at the place is appropriate. The traffic rule is a judged rule obtained by applying a traffic feature of the place to a plurality of generic rules that are applicable regardless of place".

CITATION LIST

Patent Literature

PTL 1: JP 2017-187856 A

SUMMARY OF INVENTION

Technical Problem

According to PTL 1, it is possible to improve safety by, on the vehicle side, monitoring the presence or absence of a situational traffic rule violation and stopping the vehicle at the time of a violation.

However, the technique of PTL 1 can deal with a rule violation by a vehicle in the field, but cannot deal with a rule violation by a person in the field. In addition, the configuration where rule violations are monitored on the vehicle side leads to an issue that the vehicle cost is increased not only by a need for a high-speed and expensive vehicle controller for dealing with an increased calculation amount but also by addition of a sensor for expanding a sensing range.

The present invention has been made to solve the above problem, and an object of the present invention is to improve safety and efficiency while keeping the manufacturing cost of a mobile body low by a configuration where a sensor installed in a field (infrastructure sensor) monitors the mobile body and a person, and a server (safety monitoring device) detects a rule violation on the basis of a sensing result and instructs a violator or the mobile body around on a safe action corresponding to the content of the violation.

Solution to Problem

A traffic control system of the present invention for solving the above problems includes: a mobile body; an infrastructure sensor that monitors the mobile body or a pedestrian within a field; and a safety monitoring device that communicates wirelessly with the mobile body, the safety monitoring device including a rule violation detection unit that detects, on a basis of output from the infrastructure sensor, a rule violation by the mobile body or the pedestrian within the field; and a safe action instruction unit that issues an instruction to the mobile body to execute a safe action or safe action preparation corresponding to the rule violation when the rule violation is detected, the mobile body including a speed control unit that, regardless of the instruction from the safety monitoring device, outputs a control command for decelerating the mobile body, provided that a wireless communication speed of the mobile body with the safety monitoring device is greater than or equal to a prescribed threshold.

Advantageous Effects of Invention

According to the traffic control system of the present invention, even when a rule violation by an autonomous mobile body, a manned mobile body, or a person occurs within a field to be monitored, it is possible to reduce a collision risk and a possibility of obstructing traffic while keeping the manufacturing cost of a mobile body low.

BRIEF DESCRIPTION OF DRAWINGS

FIG. 9 illustrates FIGS. 9A to 9C illustrate an example of a safe action instruction at the time of rule violation according to the first embodiment.

FIG. 10 illustrates

FIG. 11 illustrates FIGS. 11A to 11C illustrate an example of a safe action instruction at the time of rule violation according to the first embodiment.

FIG. 12 illustrates FIGS. 12A to 12C illustrate an example of a safe action instruction at the time of rule violation according to the first embodiment.

FIG. 13 illustrates FIGS. 13A to 13C illustrate an example of a safe action instruction at the time of rule violation according to the first embodiment.

FIG. 15 illustrates

FIG. 16 illustrates

DESCRIPTION OF EMBODIMENTS

Figure 1A:
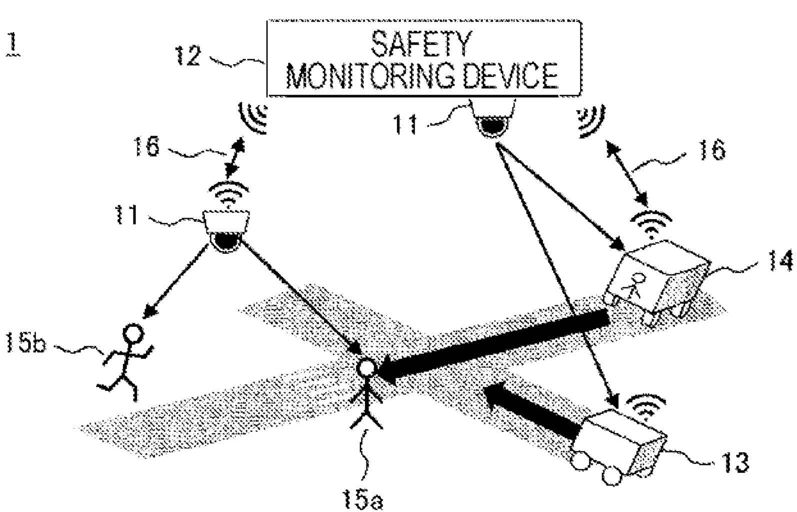
FIG. 1A is a configuration diagram of a traffic control system according to a first embodiment.

In a traffic control system 1 of the present invention, a sensor (infrastructure sensor 11) installed in a field monitors an autonomous mobile body 13, a manned mobile body 14, and a pedestrian 15. Meanwhile, a server (safety monitoring device 12) detects a rule violation on the basis of a sensing result from the infrastructure sensor, and instructs a violator, or the autonomous mobile body or the manned mobile body around on a safety action corresponding to the content of the violation. Then, in a case where failure occurs in wireless communication between the server and a mobile body and prevents the instruction on a safe action from being given in real time, the mobile body decelerates in advance to a speed at which it can stop with its own mounted sensor. Hereinafter, embodiments of the present invention will be described in detail with reference to the drawings.

First Embodiment

FIG. 1A is a configuration diagram illustrating a situation in which a traffic control system 1 of a first embodiment is arranged at a certain intersection as an example of a field to be monitored. As illustrated here, the traffic control system 1 of the present embodiment is a system including an infrastructure sensor 11, a safety monitoring device 12, and mobile bodies (autonomous mobile body 13, manned mobile body 14), where a plurality of the infrastructure sensors 11 is installed so as to be able to detect all of the autonomous mobile body 13, the manned mobile body 14, and a pedestrian 15 in the vicinity of the intersection. The safety monitoring device 12 is a server that controls traffic in the vicinity of the intersection on the basis of output from the infrastructure sensors 11, and more specifically, is a device that transmits a command necessary for ensuring safety to the autonomous mobile body 13 and the manned mobile body 14 through wireless communication depending on a result of detecting the autonomous mobile body 13, the manned mobile body 14, and the pedestrian 15. Note that the safety monitoring device 12 is connected to an adjacent infrastructure sensor 11 via a wired communication network 16, and is connected to a remote infrastructure sensor 11, the autonomous mobile body 13, and the manned mobile body 14 via a wireless communication network 16.

Figure 1B:
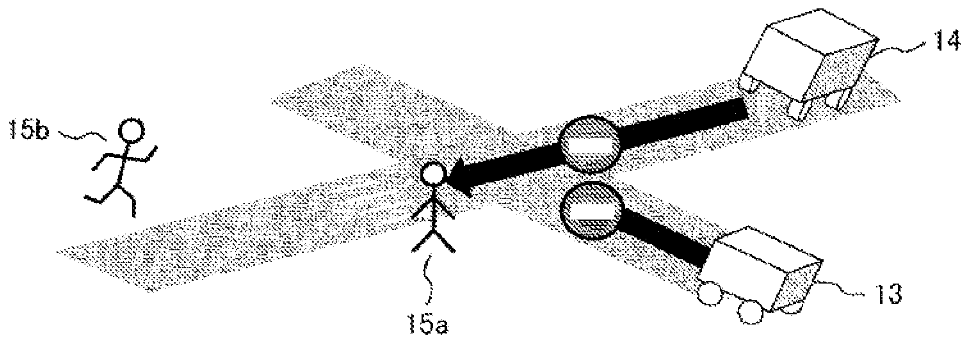
FIG. 1B illustrates a field recognized by the traffic control system according to the first embodiment.

FIG. 1B is an example of a conceptual diagram of the field (intersection) recognized by the safety monitoring device 12 on the basis of output from the infrastructure sensors 11 and traffic regulations. In FIG. 1A, one infrastructure sensor 11 detects the autonomous mobile body 13 traveling on a non-priority road and the manned mobile body 14 traveling on a priority road, and the other infrastructure sensor 11 detects a pedestrian 15*a* who is about to cross a crosswalk and a pedestrian 15*b* running toward the crosswalk. Accordingly, in the example of FIG. 1B, the safety monitoring device 12 predicts, in consideration of the output from both the infrastructure sensors 11 and the traffic regulations, that the pedestrians 15*a* and 15*b* will cross the crosswalk while the autonomous mobile body 13 is temporarily stopped before the priority road and the manned mobile body 14 is temporarily stopped before the crosswalk, and also predicts that the manned mobile body 14 might pass the crosswalk without temporarily stopping against the traffic regulations.

Figure 2:
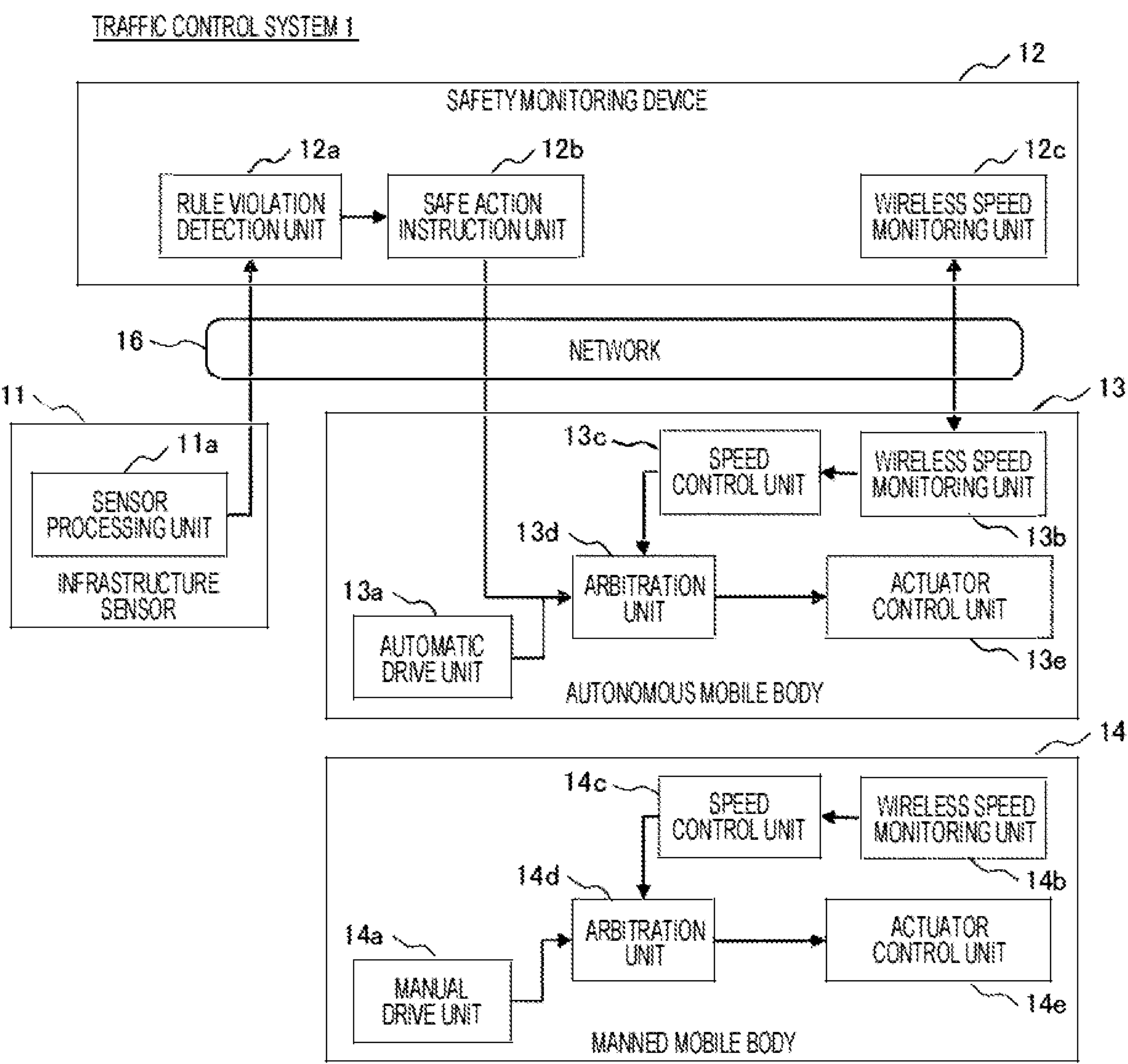
FIG. 2 is a functional block diagram of the traffic control system according to the first embodiment.

FIG. 2 illustrates a functional block diagram of the traffic control system 1. As illustrated here, the infrastructure sensor 11 includes a sensor processing unit 11*a*, and the safety monitoring device 12 includes a rule violation detection unit 12*a*, a safe action instruction unit 12*b*, and a wireless speed monitoring unit 12*c*. In addition, the autonomous mobile body 13 includes an automatic drive unit 13*a*, a wireless speed monitoring unit 13*b*, a speed control unit 13*c*, an arbitration unit 13*d*, and an actuator control unit 13*e*, and the manned mobile body 14 includes a manual drive unit 14*a*, a wireless speed monitoring unit 14*b*, a speed control unit 14*c*, an arbitration unit 14*d*, and an actuator control unit 14*e*. Hereinafter, details of each component according to the first embodiment will be described.

Infrastructure Sensor 11

The infrastructure sensor 11 is a sensor such as a camera or LiDAR that monitors the mobile bodies within the field. The sensor processing unit 11*a* generates identification information indicating a type of an object within a sensing range of the camera, LiDAR, or the like, and position information of the object, and transmits these pieces of information to the safety monitoring device 12 via the network 16.

Figure 3:
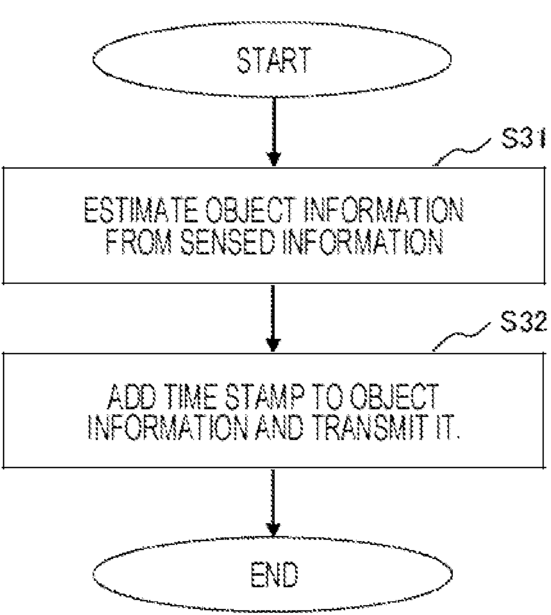
FIG. 3 illustrates a processing flow of a sensor processing unit according to the first embodiment.

FIG. 3 illustrates a processing flow of the sensor processing unit 11*a*. First, in step S31, the sensor processing unit 11*a* estimates object information (identification information and position information) from information sensed by the camera, LiDAR, or the like. Next, in step S32, the sensor processing unit 11*a* adds a time stamp to the object information and transmits the object information to the safety monitoring device 12.

Safety Monitoring Device 12

Specifically, the safety monitoring device 12 is a server including hardware such as an arithmetic device, for example, a CPU or the like, a main storage device, for example, a semiconductor memory or the like, an auxiliary storage device, and a communication device. Then, the arithmetic device executes a program loaded into the main storage device to implement each function to be described later. In the description below, such a well-known technique will be appropriately omitted.

Rule Violation Detection Unit 12*a*

The rule violation detection unit 12*a* monitors a safety rule violation by the mobile body or the pedestrian 15 on the basis of the information received from the infrastructure sensor 11, and at the time of rule violation, notifies the safe action instruction unit 12*b* of the identification information and the content of the violation.

Figure 4:
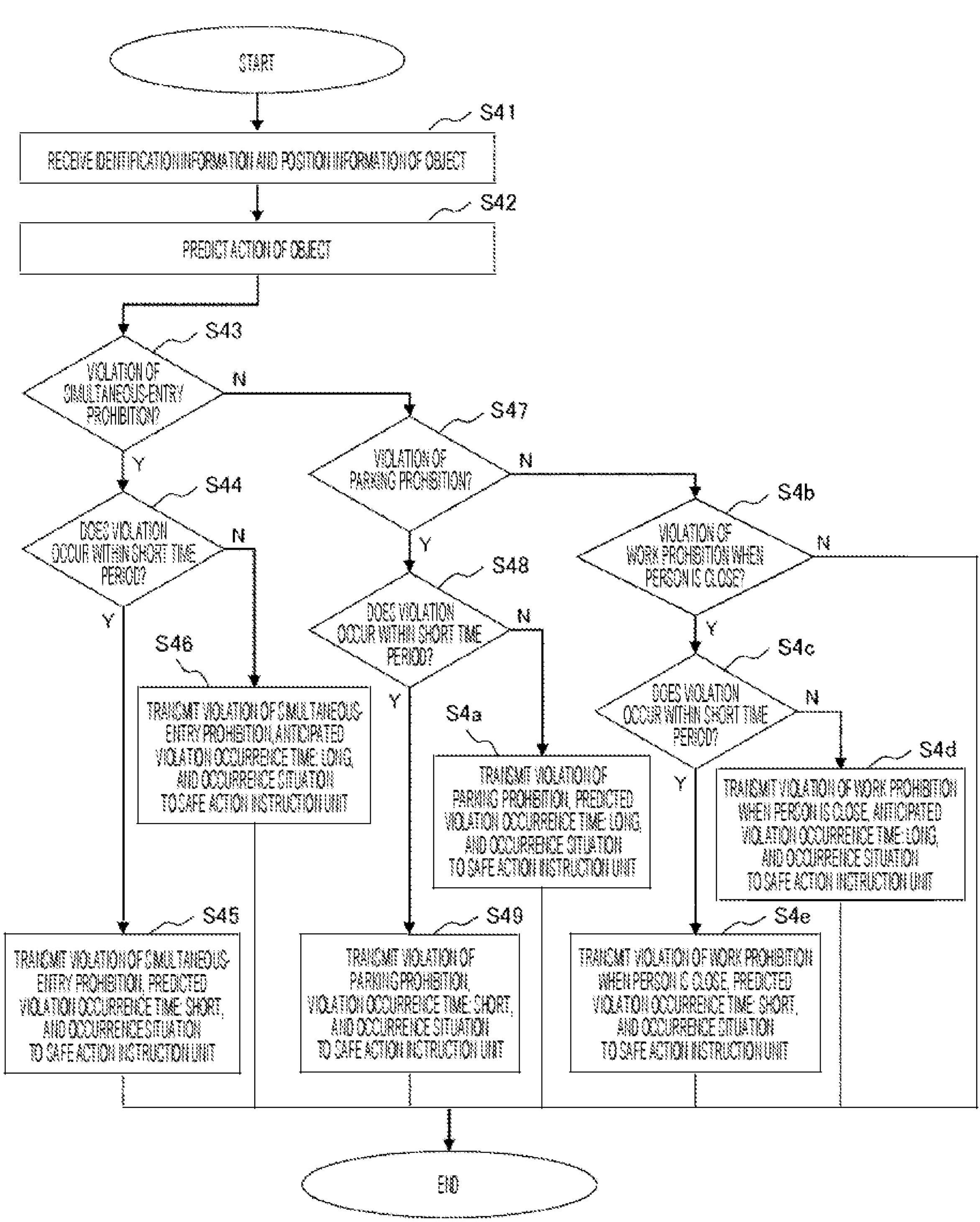
FIG. 4 illustrates a processing flow of a rule violation detection unit according to the first embodiment.

FIG. 4 illustrates a processing flow of the rule violation detection unit 12*a*. Each step will be described below.

First, in step S41, the rule violation detection unit 12*a* receives the identification information and the position information of an object from the infrastructure sensor 11.

Next, in step S42, the rule violation detection unit 12*a* predicts an action (position coordinates and an orientation) of the object from current time to a few seconds later (for example, three seconds later) on the basis of the received information and past information.

In step S43, the rule violation detection unit 12*a* determines whether or not there occurs a violation of a rule providing that objects do not enter the same area for avoiding a collision between the objects after a few seconds (violation of simultaneous-entry prohibition). If the violation occurs, the process proceeds to step S44, and if the violation does not occur, the process proceeds to step S47.

In step S44, the rule violation detection unit 12*a* determines whether or not the violation of simultaneous-entry occurs even within a certain time period (for example, one second) shorter than the time period (for example, three seconds) used for the action prediction in step S42. If the violation occurs, the process proceeds to step S45, and if the violation does not occur, the process proceeds to step S46.

In step S45, the rule violation detection unit 12*a* transmits "violation of simultaneous-entry prohibition", "predicted violation occurrence time: short", and "occurrence situation" to the safe action instruction unit 12*b*. On the other hand, in step S46, the rule violation detection unit 12*a* transmits "violation of simultaneous-entry prohibition", "predicted violation occurrence time: long", and "occurrence situation" to the safe action instruction unit 12*b*.

Note that "occurrence situation" is information including place information, assumed-violator information, and assumed-victim information. For example, in the Road Traffic Act, lanes on which a vehicle should proceed are defined according to the situation, and a vehicle or a pedestrian that violates the regulations is hereinafter referred to as an "assumed violator". Furthermore, an "assumed victim", to which a new collision risk is posed by the assumed violator, is a vehicle or a pedestrian that obeys the regulations. As another example, even in a case where a vehicle, a forklift, and the like share a road or a passage in private property (including a room) such as a factory or a distribution warehouse, an operating regulation is set for passing by each other on either one side. For example, in the case of a regulation for passing by each other on the left side, a vehicle or a person that has failed to obey the regulation is referred to as an "assumed violator", and a vehicle or a person who has obeyed the regulation is referred to as an "assumed victim".

In step S47, the rule violation detection unit 12*a* determines whether or not there occurs a violation of parking prohibition that prohibits parking in a place where parking is likely to obstruct other traffic or work. If the violation occurs, the process proceeds to step S48, and if the violation does not occur, the process proceeds to step S4*b*.

In step S48, the rule violation detection unit 12*a* determines whether or not the violation of parking prohibition occurs even within a certain time period (for example, one second) shorter than the time period (for example, three seconds) used for the action prediction in step S42. If the violation occurs, the process proceeds to step S49, and if the violation does not occur, the process proceeds to step S4*a*.

In step S49, the rule violation detection unit 12*a* transmits "violation of parking prohibition", "predicted violation occurrence time: short", and "occurrence situation" to the safe action instruction unit 12*b*. On the other hand, in step S4*a*, the rule violation detection unit 12*a* transmits "violation of parking prohibition", "predicted violation occurrence time: long", and "occurrence situation" to the safe action instruction unit 12*b*.

In step S4*b*, the rule violation detection unit 12*a* determines whether or not there occurs a violation of work prohibition when a person is close for avoiding a possibility of contact when a person is close. Specifically, it checks whether the manned mobile body 14 or the pedestrian 15 is present within a range r around the mobile body to be monitored. If the violation occurs, the process proceeds to step S4*c*, and if the violation does not occur, the operation flow ends.

In step S4*c*, the rule violation detection unit 12*a* determines whether or not the violation of work prohibition when a person is close occurs even within a certain time period (for example, one second) shorter than the time period (for example, three seconds) used for the action prediction in step S42. If the violation occurs, the process proceeds to step S4*d*, and if the violation does not occur, the process proceeds to step S4*e*.

In step S4*d*, the rule violation detection unit 12*a* transmits "violation of work prohibition when a person is close", "predicted violation occurrence time: short", and "occurrence situation" to the safe action instruction unit 12*b*. On the other hand, in step S4*e*, the rule violation detection unit 12*a* transmits "violation of work prohibition when a person is close", "predicted violation occurrence time: long", and "occurrence situation" to the safe action instruction unit 12*b*.

Safe Action Instruction Unit 12*b*

Figure 5:
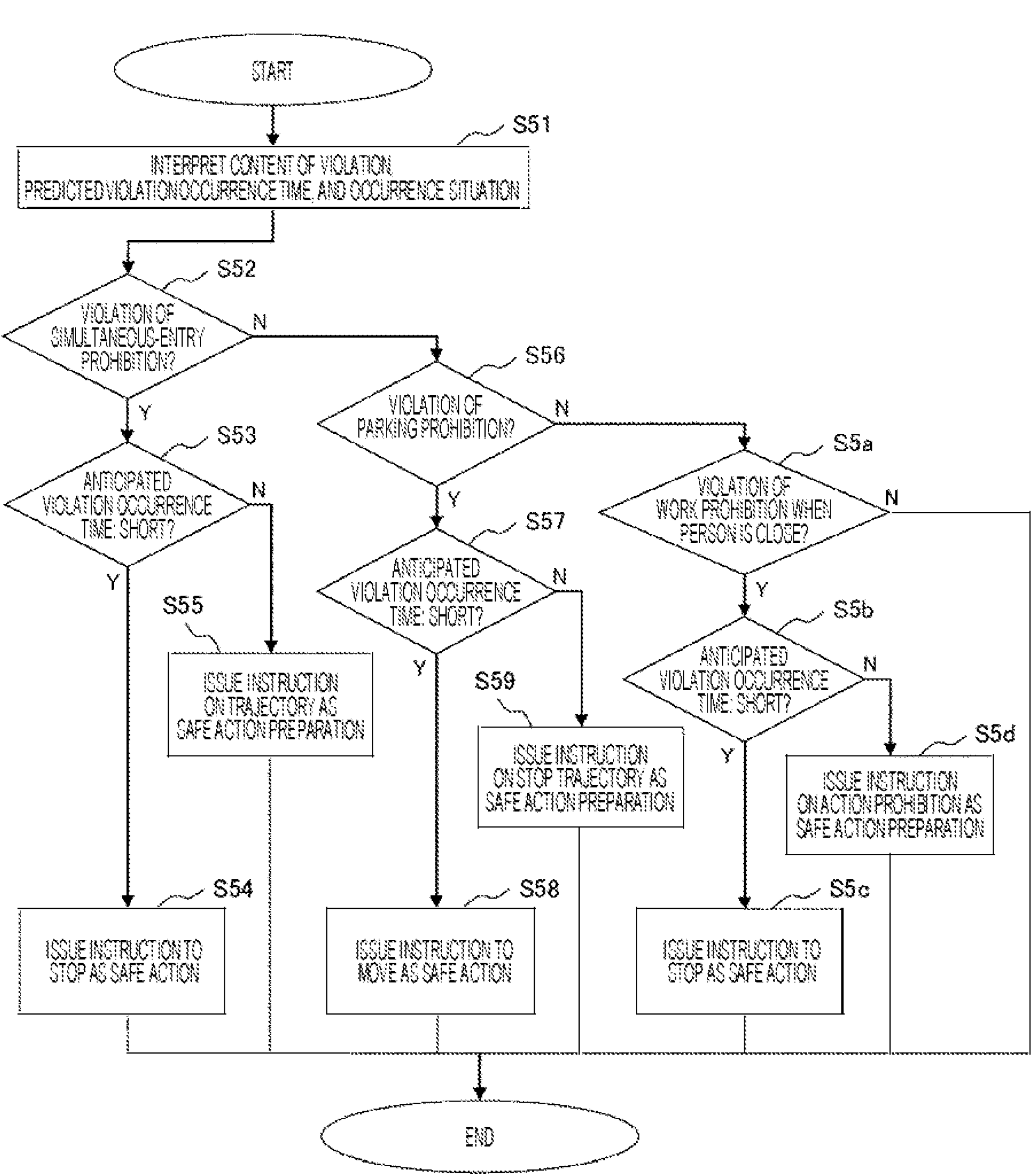
FIG. 5 illustrates a processing flow of a safe action instruction unit according to the first embodiment.

FIG. 5 illustrates a processing flow of the safe action instruction unit 12*b* that has received information from the rule violation detection unit 12*a*. Each step will be described below.

First, in step S51, the safe action instruction unit 12*b* interprets "content of violation", "predicted violation occurrence time", and "occurrence situation" input from the rule violation detection unit 12*a*.

Next, in step S52, the safe action instruction unit 12*b* determines whether the content of violation is "violation of simultaneous-entry prohibition". If TRUE, the process proceeds to step S53, and if FALSE, the process proceeds to step S56.

In step S53, the safe action instruction unit 12*b* determines whether the predicted violation occurrence time is "short". If TRUE, the process proceeds to step S54, and if FALSE (if "long"), the process proceeds to step S55.

In step S54, the safe action instruction unit 12*b* determines, from the occurrence situation information, whether or not an assumed violator can be controlled by a safe action instruction. When the assumed violator can be controlled, the safe action instruction unit 12*b* instructs the assumed violator to stop as a safe action for avoiding a collision. When the assumed violator cannot be controlled, the safe action instruction unit 12*b* instructs an assumed victim to stop as the safe action for avoiding a collision. Note that, in a case where an instruction on safe action preparation has been issued in advance in step S55 to be described later, an instruction only to execute the safe action preparation may be issued in this step.

On the other hand, in step S55, the safe action instruction unit 12*b* determines, from the occurrence situation information, whether or not the assumed violator can be controlled by a safe action instruction. When the assumed violator can be controlled, the safe action instruction unit 12*b* instructs the assumed violator on a stop trajectory as safe action preparation for avoiding a collision. When the assumed violator cannot be controlled, the safe action instruction unit 12*b* instructs the assumed victim on an avoidance trajectory as the safe action preparation for avoiding a collision.

In step S56, the safe action instruction unit 12*b* determines whether the content of violation is "violation of parking prohibition". If TRUE, the process proceeds to step S57, and if FALSE, the process proceeds to step S5*a*.

In step S57, the safe action instruction unit 12*b* determines whether the predicted violation occurrence time is "short". If TRUE, the process proceeds to step S58, and if FALSE (if "long"), the process proceeds to step S59.

In step S58, the safe action instruction unit 12*b* determines, from the occurrence situation information, whether or not the assumed violator can be controlled by a safe action instruction. When the assumed violator can be controlled, the safe action instruction unit 12*b* instructs the assumed violator to move as a safe action for avoiding a parking violation. Note that, in a case where an instruction on safe action preparation has been issued in advance in step S59 to be described later, an instruction only to execute the safe action preparation may be issued in this step. When the assumed violator cannot be controlled, the safe action instruction unit 12*b* notifies a manager of the occurrence situation information.

On the other hand, in step S59, the safe action instruction unit 12*b* determines, from the occurrence situation information, whether or not the assumed violator can be controlled by a safe action instruction. When the assumed violator can be controlled, the safe action instruction unit 12*b* instructs the assumed violator on a stop trajectory as safe action preparation for avoiding a collision.

In step S5*a*, the safe action instruction unit 12*b* determines whether the content of violation is "violation of work prohibition when a person is close". If TRUE, the process proceeds to step S5*b*, and if FALSE, the operation flow ends.

In step S5*b*, the safe action instruction unit 12*b* determines whether the predicted violation occurrence time is "short". If TRUE, the process proceeds to step S5*c*, and if FALSE (if "long"), the process proceeds to step S5*d*.

In step S5*c*, the safe action instruction unit 12*b* determines, from the occurrence situation information, whether or not the assumed violator can be controlled by a safe action instruction. When the assumed violator can be controlled, the safe action instruction unit 12*b* instructs the assumed violator to stop working as a safe action for avoiding a collision. When the assumed violator cannot be controlled, the safe action instruction unit 12*b* instructs the assumed victim to stop as the safe action for avoiding a collision.

On the other hand, in step S5*d*, the safe action instruction unit 12*b* determines, from the occurrence situation information, whether or not the assumed violator can be controlled by a safe action instruction. When the assumed violator can be controlled, the safe action instruction unit 12*b* instructs the assumed violator on action prohibition as safe action preparation for avoiding a collision. When the assumed violator cannot be controlled, the safe action instruction unit 12*b* instructs the assumed victim on an avoidance trajectory as the safe action preparation for avoiding a collision.

Autonomous Mobile Body 13, Manned Mobile Body 14

As described above, the autonomous mobile body 13 includes the automatic drive unit 13*a*, the wireless speed monitoring unit 13*b*, the speed control unit 13*c*, the arbitration unit 13*d*, and the actuator control unit 13*e*, and the manned mobile body 14 includes the manual drive unit 14*a*, the wireless speed monitoring unit 14*b*, the speed control unit 14*c*, the arbitration unit 14*d*, and the actuator control unit 14*e*. Note that the configurations of both the mobile bodies are equivalent except for the automatic drive unit 13*a* and the manual drive unit 14*a*. Thus, hereinafter, in principle, the configuration of the autonomous mobile body 13 will be described in detail, and detailed description of the configuration of the manned mobile body 14 will be appropriately omitted.

cl Automatic Drive Unit 13*a*

The automatic drive unit 13*a* generates a vehicle control instruction for guiding the vehicle to a destination on the basis of an environment recognition sensor mounted on the vehicle (hereinafter, referred to as "mounted sensor"), and transmits the vehicle control instruction to the arbitration unit 13*d*. For example, when the environment recognition sensor (such as a camera or LiDAR) of the autonomous mobile body 13 detects an obstacle ahead, an emergency stop instruction is generated in order to avoid a collision.

Manual Drive Unit 14*a*

The manual drive unit 14*a* specifically includes a steering wheel, an accelerator pedal, and a brake pedal, which are operated by a driver, as well as sensors and the like that detect operation amounts of them. The manual drive unit 14*a* is an input unit for the driver to control steering and acceleration/deceleration of the manned mobile body 14.

Wireless Speed Monitoring Unit 13*b*

If the wireless communication network 16 connecting the safety monitoring device 12 with the autonomous mobile body 13 or the manned mobile body 14 is normal, the safety monitoring device 12 can secure safety within the field by controlling an assumed violator or an assumed victim (the autonomous mobile body 13 or the manned mobile body 14) according to the flowchart of FIG. 5. However, if the wireless communication network 16 is abnormal, an assumed violator or an assumed victim might not be able to execute a safety action or the like at an appropriate timing even if the safe action instruction unit 12*b* transmits an appropriate instruction at an appropriate timing. Thus, the autonomous mobile body 13 of the present embodiment cooperates with the safety monitoring device 12 to evaluate current communication quality (wireless communication speed) of the wireless communication network 16, and switches, depending on a result of the evaluation, between a safe action mode where an instruction from the safety monitoring device 12 is followed and an autonomous safe action mode.

Figure 6:
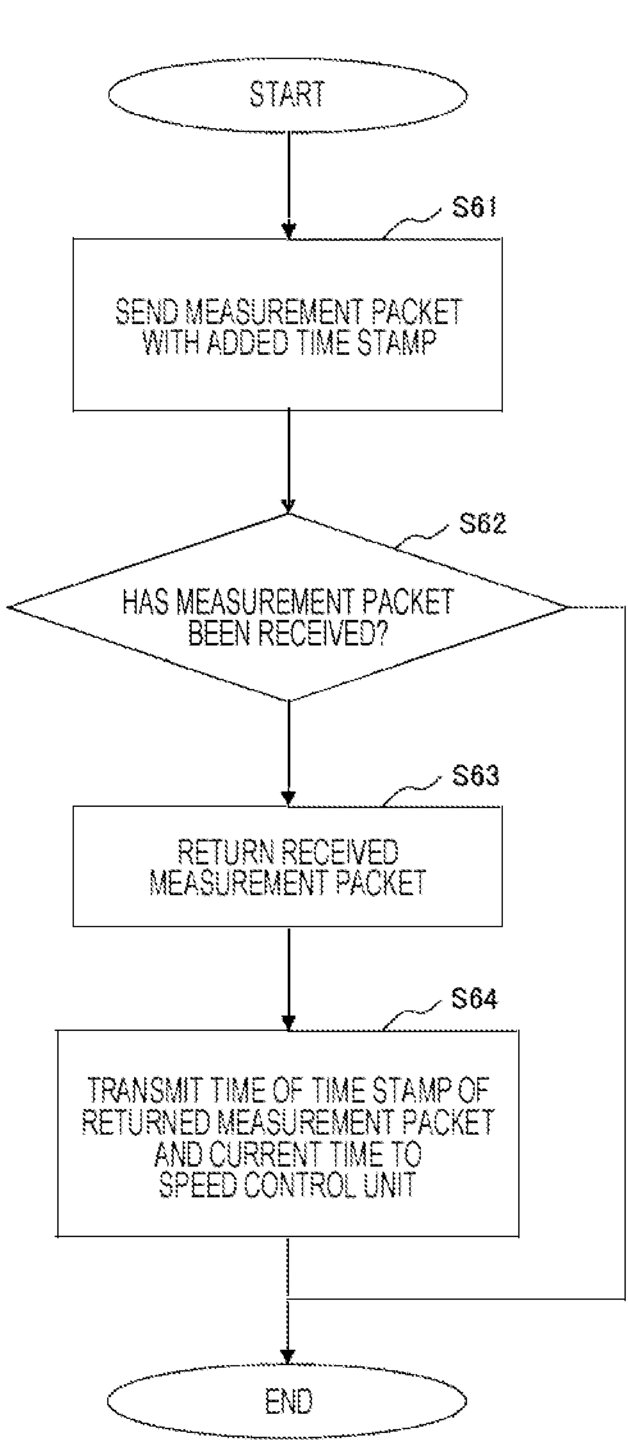
FIG. 6 illustrates a processing flow of a wireless speed monitoring unit according to the first embodiment.

FIG. 6 illustrates a processing flow of the wireless speed monitoring units 12*c* and 13*b* when the network 16 is evaluated. Each step will be described below.

First, in step S61, the wireless speed monitoring unit 13*b* of the autonomous mobile body 13 transmits a measurement packet with an added time stamp indicating current time to the wireless speed monitoring unit 12*c* of the safety monitoring device 12 via the wireless communication network 16.

In step S62, the wireless speed monitoring unit 12*c* determines whether it has received the measurement packet from the wireless speed monitoring unit 13*b*. Then, if the measurement packet has been received, the process proceeds to step S63, and if it has not been received, the process ends.

In step S63, the wireless speed monitoring unit 12*c* returns the received measurement packet as it is to the wireless speed monitoring unit 13*b*.

In step S64, the wireless speed monitoring unit 13*b* of the autonomous mobile body 13 transmits both the time of the time stamp of the returned measurement packet and current time to the speed control unit 13*c*.

When nothing is returned from the wireless speed monitoring unit 12*c* even after a prescribed time elapses after the wireless speed monitoring unit 13*b* transmits the measurement packet in step S61, the wireless speed monitoring unit 13*b* may retransmit a measurement packet or may transmit information indicating that the network 16 is abnormal to the speed control unit 13*c*.

Speed Control Unit 13*c*

The speed control unit 13*c* sends a prescribed deceleration command to the arbitration unit 13*d* depending on output from the wireless speed monitoring unit 13*b*.

Figure 7:
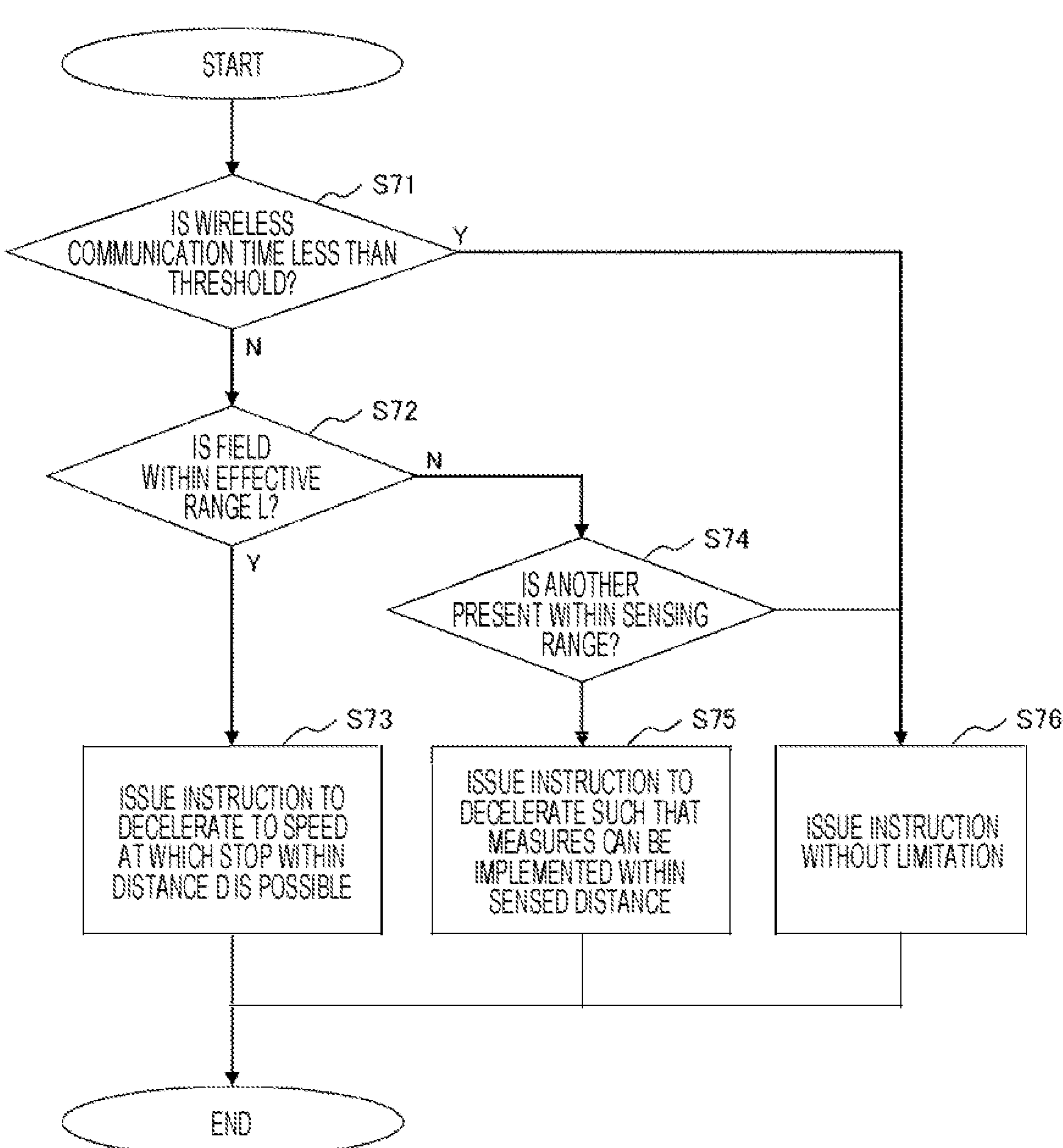
FIG. 7 illustrates a processing flow of a speed control unit according to the first embodiment.

FIG. 7 illustrates a processing flow of the speed control unit 13*c*. Each step will be described below.

First, in step S71, the speed control unit 13*c* determines whether or not the difference between the time of the time stamp and the current time which have been input (wireless communication time) is less than a threshold. If FALSE, the process proceeds to step S72, and if TRUE, the process proceeds to step S76. This threshold is defined in line with a deadline which can ensure that a collision can be avoided if an instruction on a safe action is issued after a rule violation is detected. In view of this, the case of FALSE in step S71, that is, the case where the wireless communication time is greater than or equal to the threshold means that the wireless communication is in such a state that a collision cannot be avoided even if the safety monitoring device 12 instructs the autonomous mobile body 13 on a safe action. When the wireless speed monitoring unit 13*b* has failed to receive the return from the wireless speed monitoring unit 12*c*, the determination in step S71 is also FALSE.

Next, in step S72, the speed control unit 13*c* determines whether or not the field F monitored by the infrastructure sensor 11 is within a prescribed effective range L (for example, 500 m) on the basis of map information. If TRUE, the process proceeds to step S73, and if FALSE, the process proceeds to step S74. Note that the field F is a place where the infrastructure sensor 11 is required to monitor a blind spot of the autonomous mobile body 13 because another mobile body or pedestrian 15 might abruptly come out from the blind spot. Specifically, the field F is an intersection, an entrance/exit of a building, or the like monitored by the infrastructure sensor 11.

In step S73, the speed control unit 13*c* assumes that another mobile body or pedestrian 15 abruptly comes out from a blind spot in the field F, and issues an instruction to decelerate to a speed at which the autonomous mobile body 13 can stop within a distance D to the field F. Note that a current position of the autonomous mobile body 13 is obtained by a self-position estimation means such as a method of matching a surrounding landmark to a map, a method of obtaining data from a GPS or GNSS, or a method of calculating odometry from a departure point.

In step S74, the speed control unit 13*c* determines whether or not another mobile body or pedestrian 15 is present within a sensing range R where recognition can be performed by the mounted sensor. If TRUE, the process proceeds to step S75, and if FALSE, the process proceeds to step S76.

In step S75, the speed control unit 13*c* issues an instruction to decelerate to a speed at which measures can be implemented with stop or avoidance within a distance to the other mobile body or pedestrian 15 having been sensed.

In step S76, the speed control unit 13*c* generates a control command "without speed limitation", which means that speed limitation is not imposed from the viewpoint of the communication speed. The reason why such an instruction is issued is that, in a case where there is no abnormality in the network 16, even if the autonomous mobile body 13 is traveling at an arbitrary speed, it can avoid a collision with another mobile body or pedestrian 15 detected by the infrastructure sensor 11 by following an instruction from the safety monitoring device 12.

Arbitration Unit 13*d*

The arbitration unit 13*d* selects an instruction having the greatest deceleration value from among a vehicle control instruction input from the automatic drive unit 13*a*, a safe action input from the safe action instruction unit 12*b*, and a deceleration instruction or an instruction without speed limitation input from the speed control unit 13*c*, and transmits the selected control command to the actuator control unit 13*e*. Here, the instruction having the greatest deceleration value is selected in order to secure safety even in the most dangerous situation because the instruction having the greatest deceleration value usually corresponds to the most dangerous situation.

Note that a trajectory of safe action preparation input from the safe action instruction unit 12*b* is once stored, and takes effect and is added to the options of the arbitration unit 13*d* only when an instruction is issued.

Actuator Control Unit 13*e*

The actuator control unit 13*e* controls steering, a motor, and a brake of the autonomous mobile body 13 to realize desired steering control and acceleration/deceleration control on the basis of a control command input from the arbitration unit 13*d*.

Operation Example of Autonomous Mobile Body 13

Figure 8A:
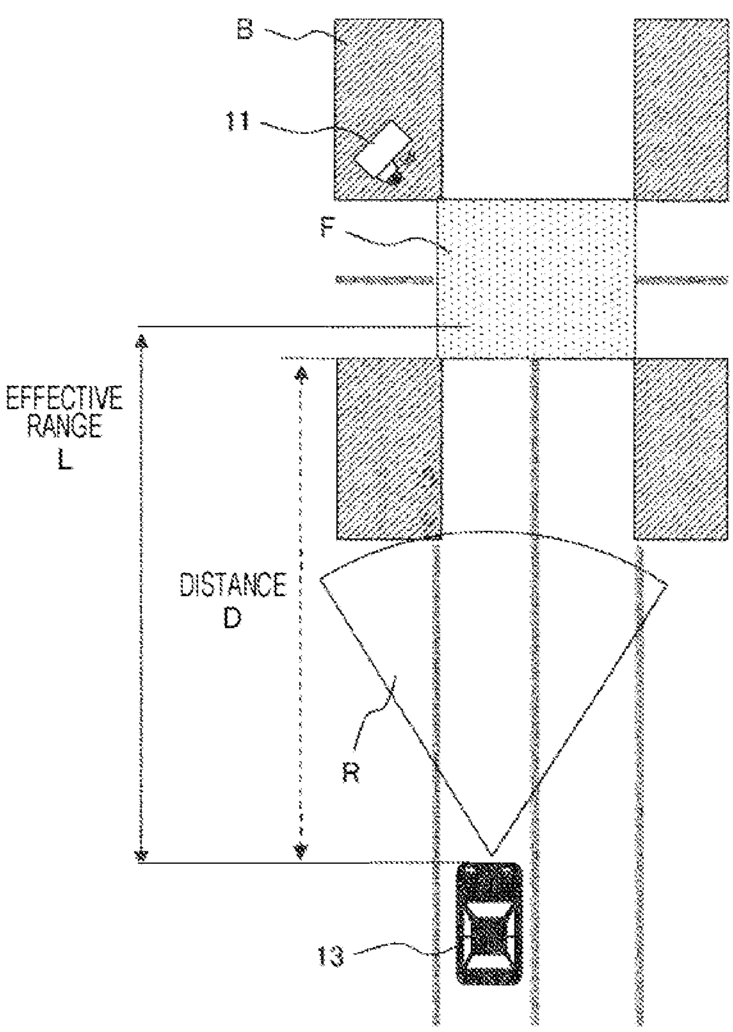
FIG. 8A illustrates an operation example of the speed control unit according to the first embodiment.

FIGS. 8A, B illustrate an operation example of the speed control unit 13*c* of the present embodiment. Here, it is supposed that obstacles such as a building B, a wall, and a tree exist at four corners of an intersection, and the environment recognition sensor of the autonomous mobile body 13 entering the intersection cannot detect a mobile body or pedestrian 15 in shadow of the building B. In such circumstances, there is a possibility that, when another mobile body or pedestrian 15 abruptly comes out from a blind spot, a collision cannot be avoided by autonomous control of the autonomous mobile body 13. Thus, the infrastructure sensor 11 is provided to monitor the intersection as a field F to be monitored. When the infrastructure sensor 11 detects another mobile body or pedestrian 15 in a blind spot, the safety monitoring device 12 instructs the autonomous mobile body 13 on a safe action such as stop, leading to avoiding a collision.

However, in a case where the determination is FALSE in step S71 in FIG. 7, that is, in a case where the network 16 is abnormal, even if the safety monitoring device 12 issues an instruction on a safe action, the autonomous mobile body 13 cannot receive the instruction at an appropriate timing. Thus, if the autonomous mobile body 13 enters the intersection while maintaining a high speed, it might collide with another mobile body or pedestrian 15 that has abruptly come out.

Therefore, when the autonomous mobile body 13 in FIG. 8A detects the intersection with a blind spot (field F) within the prescribed effective range L, the speed control unit 13*c* determines a deceleration degree and generates a deceleration command to be output to the arbitration unit 13*d* such that that the autonomous mobile body 13 can decelerate to a speed at which an emergency stop can be performed with the mounted sensor within a range of the distance D from a current position to the field F. Accordingly, the autonomous mobile body 13 enters the intersection at a low speed that allows emergency restraint.

Figure 8B:
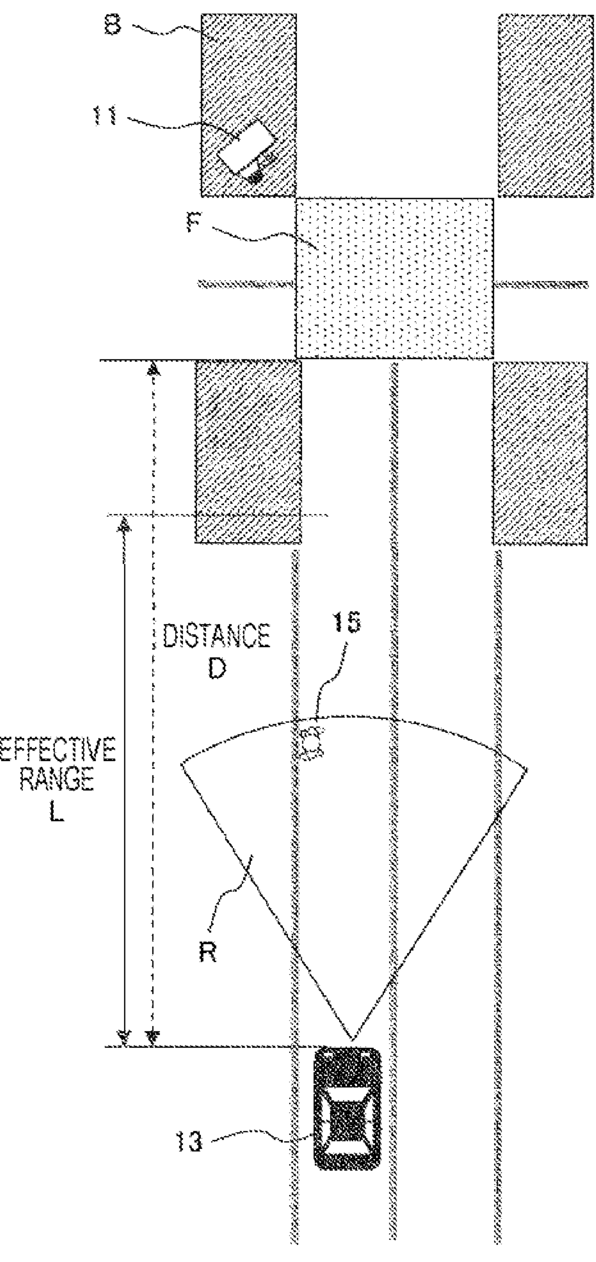
FIG. 8B illustrates an operation example of the speed control unit according to the first embodiment.

On the other hand, in FIG. 8B, the field F does not exist within the effective range L, so that the deceleration command for stopping within the range of the distance D from the current position to the field F is not generated. However, a pedestrian 15 exists within the sensing range R of the mounted sensor, so that a deceleration command for avoiding a collision with the pedestrian 15 is generated.

FIG. 9 illustrates an example of a safe action instruction at the time of rule violation. FIG. 9(*a*) illustrates a situation of an intersection. FIG. 9(*b*) illustrates a result of action prediction. A trajectory T of the action prediction indicates transition of position information and orientation within a certain time period from current time, and includes a trajectory T1 of a close time period (for example, from the current time to one second later) indicated by black circles and a subsequent trajectory T2 (for example, one second to three seconds later) indicated by white circles. FIG. 9(*c*) illustrates examples of a rule violation detection determination status and a safe action instruction. It is determined whether or not simultaneous-entry-prohibited areas A, which are calculated on the basis of the trajectory T of the action prediction, overlap each other. If they overlap each other, whether the violation occurs in the close time period is determined on the basis of the trajectory T1, and whether the violation occurs in the subsequent time period is determined on the basis of the trajectory T2. In a case where the vehicles are allowed to preferentially travel by a signal or the like, the pedestrian 15 is an assumed violator of the rule violation but is not a control target by a safe action instruction. Thus, a stop instruction as the safe action instruction is sent to the vehicle (autonomous mobile body 13) that is an assumed victim (step S54 in FIG. 5).

Figure 10A:
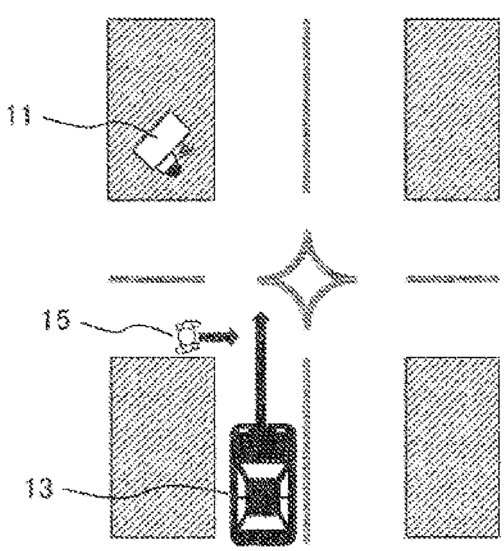
FIGS. 10A to 10C illustrate an example of a safe action instruction at the time of rule violation according to the first embodiment.
Figure 10B:
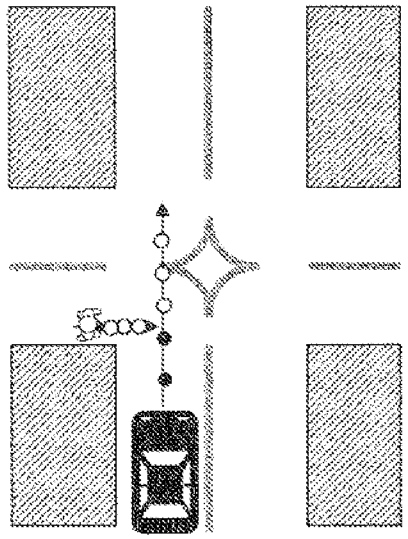
Figure 10C:
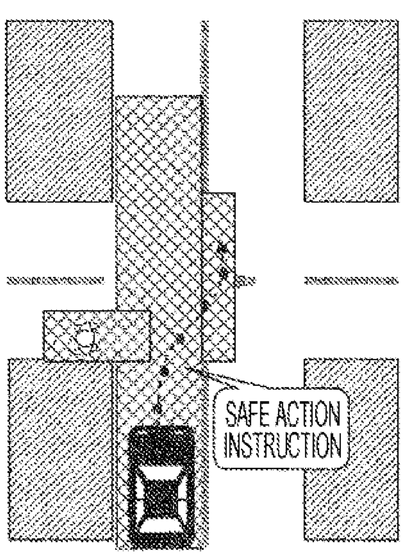

FIG. 10 illustrates another example of a safe action instruction at the time of rule violation. FIG. 10(*a*) illustrates a situation of an intersection. FIG. 10(*b*) illustrates a result of action prediction. FIG. 10(*c*) illustrates examples of a rule violation detection determination status and a safe action instruction. As compared with the example of FIG. 9, there is no oncoming vehicle. Thus, an avoidance operation sent in advance as safe action preparation by the safe action instruction unit 12*b* is used for avoidance (step S55 in FIG. 5).

FIG. 11 illustrates still another example of a safe action instruction at the time of rule violation. FIG. 11(*a*) illustrates a situation of a straight line. FIG. 11(*b*) illustrates a result of action prediction. A trajectory of the action anticipation indicates a possibility that the autonomous mobile body 13 might cross a center line. FIG. 11(*c*) illustrates examples of a rule violation detection determination status and a safe action instruction. According to the result of the action prediction, a violation of simultaneous-entry prohibition occurs. Thus, the safe action instruction unit 12*b* generates a trajectory not crossing the center line (step S55 in FIG. 5).

FIG. 12 illustrates still another example of a safe action instruction at the time of rule violation. FIG. 12(*a*) illustrates a situation of a straight line and a vehicle that will join the straight line. FIG. 12(*b*) illustrates a result of action prediction. A trajectory of the action anticipation indicates that the autonomous mobile body 13 passes the straight line in a situation where the pedestrian 15 hidden by the manned mobile body 14 as a stopped vehicle will cross the road. FIG. 12(*c*) illustrates examples of a rule violation detection determination status and a safe action instruction. The pedestrian 15 violates simultaneous entry, and thus the safe action instruction unit 12*b* sends a stop trajectory to the autonomous mobile body 13 (step S54 in FIG. 5).

FIG. 13 illustrates still another example of a safe action instruction at the time of rule violation. FIG. 13(*a*) illustrates a situation immediately after the stop in FIG. 12. FIG. 13(*b*) illustrates a result of action prediction. Along with the stop of the autonomous mobile body 13, the pedestrian 15 notices the autonomous mobile body 13 and is thus stopped. FIG. 13(*c*) illustrates examples of a rule violation detection determination status and a safe action instruction. The stop position corresponds to an entrance/exit, where parking is prohibited, and thus the autonomous mobile body 13 generates an avoidance operation as the safe action instruction (step S58 in FIG. 5).

According to the present embodiment, safety is improved by following a safe action instruction from the safety monitoring device even when a violator violates a rule due to erroneous judgement, erroneous operation, or the like.

According to the present embodiment, even in a place with poor visibility for a person, an instruction that does not require deceleration is taken in a case where there are no autonomous mobile bodies, manned mobile bodies, and pedestrians. Therefore, efficiency of mobile services can be improved while maintaining safety. A case where autonomous mobile bodies, manned mobile bodies, and pedestrians are separated from each other by a physical obstacle on a road and cannot join and leave each other may be treated as the absence case, and this is judged by a distance in a passable route.

According to the present embodiment, when an autonomous mobile body or a manned mobile body is parked in a no-parking place, the safety monitoring device can cause the autonomous mobile body or the manned mobile body to move to a safe place.

According to the present embodiment, even if a delay occurs in wireless communication between an autonomous mobile body and the safety monitoring device or in wireless communication between a manned mobile body and the safety monitoring device, the autonomous mobile body or the manned mobile body decelerates according to the situation. Therefore, safety is improved.

According to the present embodiment, a trajectory is sent in advance as safe action preparation, allowing a safe action instruction to be promptly carried out at the time of rule violation.

According to the present embodiment, a rule violation may be detected collectively in an area monitored by the traffic control system or may be detected by each infrastructure sensor.

According to the present embodiment, a wireless communication speed is estimated on the basis of a time stamp of a vehicle, but the present invention is not limited thereto. For example, time synchronization may be performed between the safety monitoring device and the autonomous mobile body or the manned mobile body.

According to the present embodiment, action prediction is performed from monitoring information provided by an infrastructure sensor, but the present invention is not limited thereto. For example, self-position information may be obtained from the autonomous mobile body or the manned mobile body, or a planned movement route generated by the autonomous mobile body may be obtained.

According to the present embodiment, simultaneous-entry prohibition and parking prohibition are monitored as safety rules, but the present invention is not limited thereto. For example, entry prohibition that prohibits a specified mobile body, even if alone, from entering a specified area may also be monitored. The present invention is not limited thereto.

Second Embodiment

Next, a second embodiment of the present invention will be described. Note that redundant description of commonalities with the first embodiment will be omitted.

Figure 14A:
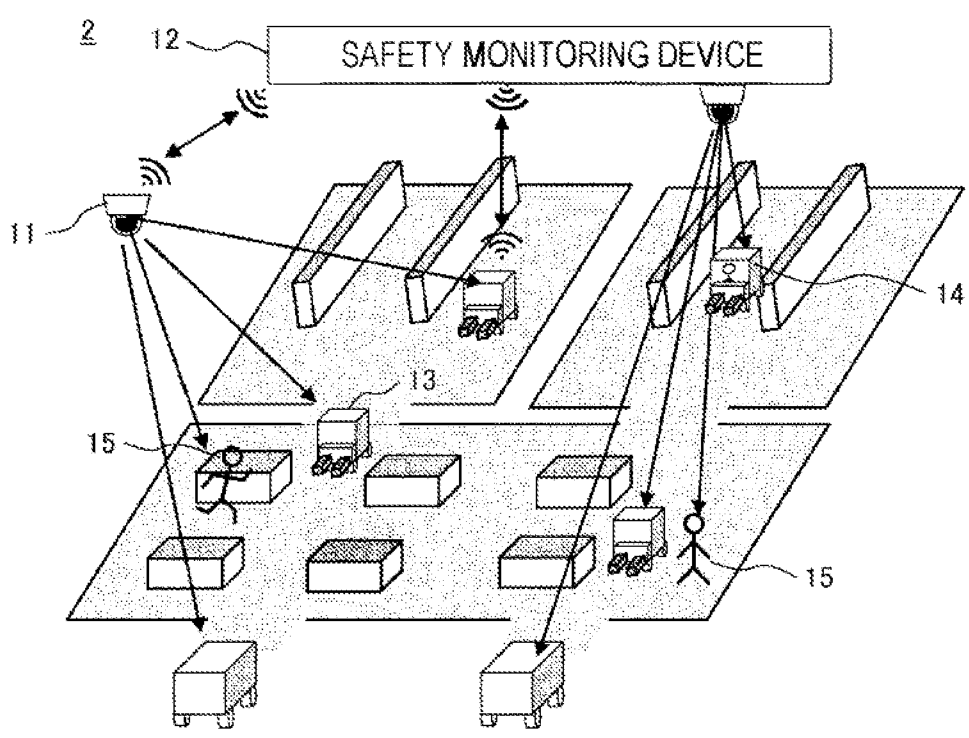
FIG. 14A is a configuration diagram of a traffic control system according to a second embodiment.
Figure 14B:
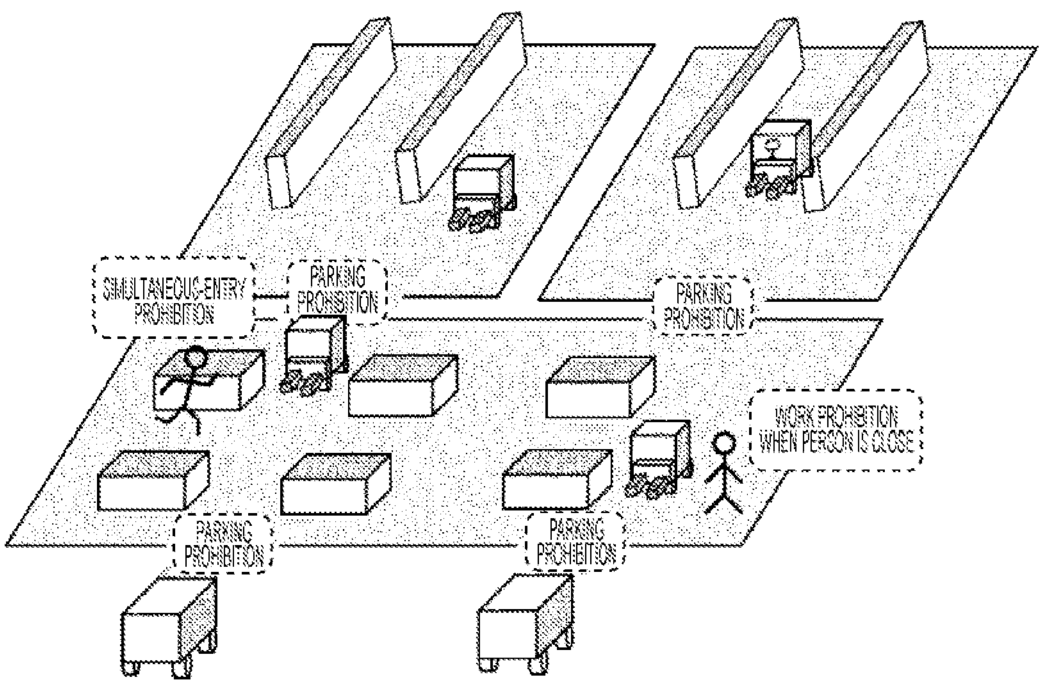
FIG. 14B illustrates a field recognized by the traffic control system according to the second embodiment.

FIG. 14A illustrates a configuration diagram of a traffic control system 2 according to the second embodiment of the present invention. The traffic control system 2 includes an infrastructure sensor 11, a safety monitoring device 12, an automatic mobile body 13, a manned mobile body 14, and a pedestrian 15. FIG. 14B is a conceptual diagram of a field recognized by the safety monitoring device 12 on the basis of output from the infrastructure sensor 11 and safety rules, as in FIG. 1B in the first embodiment.

Figure 15A:
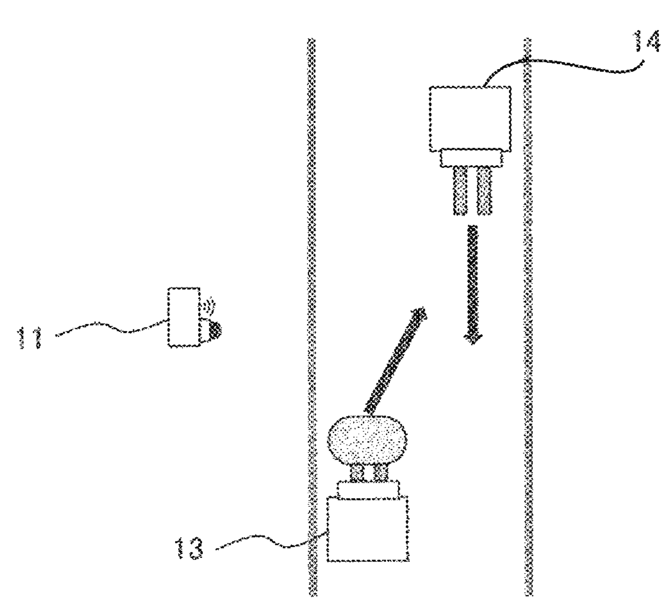
FIGS. 15A to 15C illustrate an example of a safe action instruction at the time of rule violation according to the second embodiment.
Figure 15B:
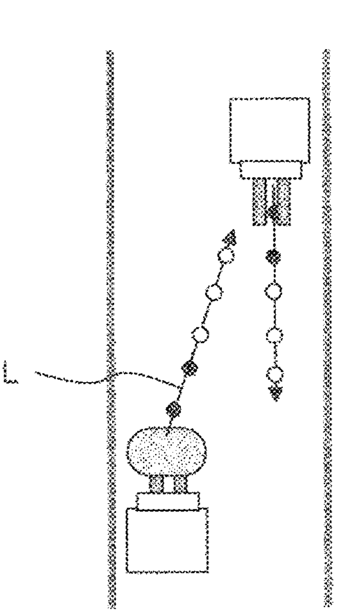
Figure 15C:
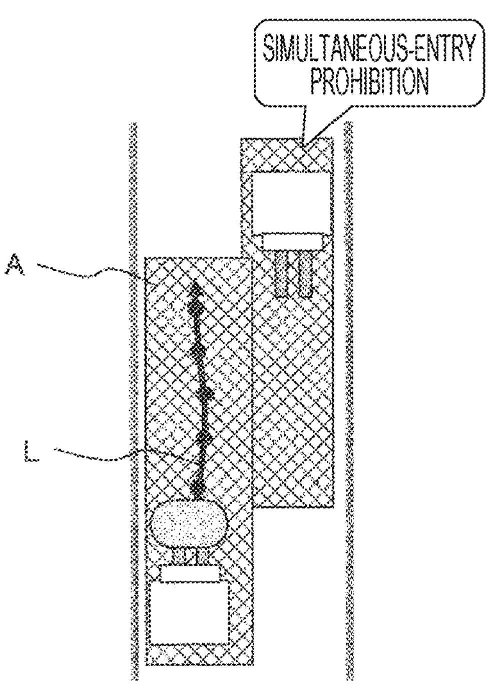

FIG. 15 illustrates an example of a safe action instruction at the time of rule violation according to the second embodiment. FIG. 15(*a*) illustrates a situation of a passage where a left-hand traffic rule is imposed. FIG. 15(*b*) illustrates a result of action prediction. A trajectory T of the action anticipation indicates a possibility that the autonomous mobile body 13 might abruptly go out to the right side beyond the center of the passage. FIG. 15(*c*) illustrates examples of a rule violation detection determination status and a safe action instruction. According to the result of the action prediction, a violation of simultaneous-entry prohibition occurs. Thus, the safe action instruction unit 12*b* generates a trajectory not crossing the center line for the autonomous mobile body 13 as a violator.

Figure 16A:
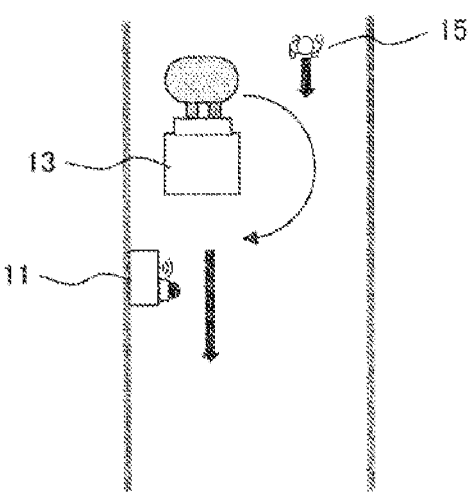
FIGS. 16A to 16C illustrate an example of a safe action instruction at the time of rule violation according to the second embodiment.
Figure 16B:
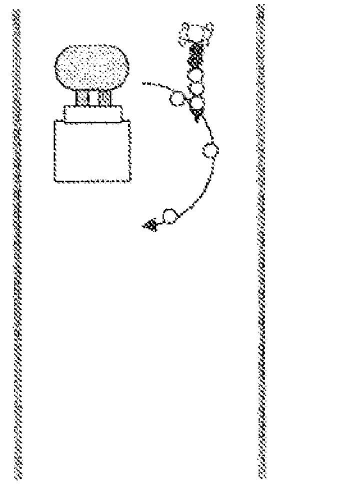
Figure 16C:
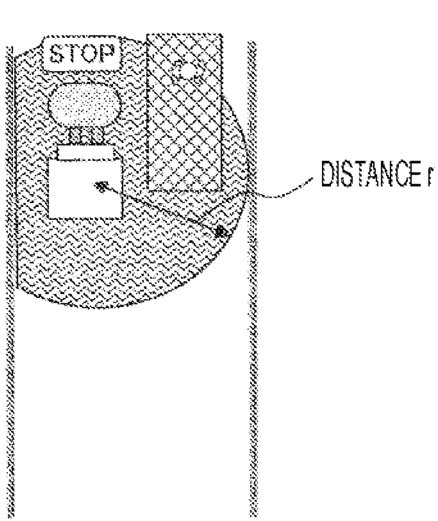

FIG. 16 illustrates an example of a safe action instruction at the time of rule violation according to the second embodiment. FIG. 16(*a*) illustrates a situation in which an autonomous mobile body that is carrying a load turns in a passage. FIG. 16(*b*) illustrates a result of action prediction. A trajectory of the action anticipation indicates a possibility that the autonomous mobile body 13 might turn rightward. FIG. 16(*c*) illustrates examples of a rule violation detection determination status and a safe action instruction. According to the result of the action prediction, a violation of work prohibition when a person is close occurs. Thus, the safe action instruction unit 12*b* sends a stop instruction to the autonomous mobile body 13 as a violator.

According to the present embodiment, even in a situation without a center line as in the first embodiment, a violation of simultaneous-entry prohibition can be detected. Therefore, safety can be improved.

According to the present embodiment, even in a case where work should not be performed when there is a person around, it is possible to detect a deviation from the rule and stop a violation action by a stop instruction from the safety monitoring device. Therefore, safety can be improved.

REFERENCE SIGNS LIST

1, 2 traffic control system
11 infrastructure sensor
11*a* sensor processing unit
12 safety monitoring device
12*a* rule violation detection unit
12*b* safe action instruction unit
12*c* wireless speed monitoring unit
13 autonomous mobile body
13*a* automatic drive unit
13*b* wireless speed monitoring unit
13*c* speed control unit
13*d* arbitration unit
13*e* actuator control unit
14 manned mobile body
14*a* manual drive unit
14*b* wireless speed monitoring unit
14*c* speed control unit
14*d* arbitration unit
14*e* actuator control unit
15 pedestrian
16 network

The invention claimed is:

1. A traffic control system comprising:
a mobile body;
an infrastructure sensor that monitors the mobile body and a pedestrian within a field, including monitoring the pedestrian in a blind spot of the mobile body; and
a safety monitoring device that communicates wirelessly with the mobile body,
the safety monitoring device including
a rule violation detection unit that detects, on a basis of output from the infrastructure sensor, a rule violation by the mobile body or the pedestrian within the field, the rule violation being determined based on public traffic regulations and custom traffic rules on a private property, and
a safe action instruction unit that issues an instruction to the mobile body to execute a safe action or safe action preparation corresponding to the rule violation when the rule violation is detected, based on a determination of whether a difference between a time stamp, received by the safety monitoring device from the mobile body as part of a measurement packet, and a current time is less than a time threshold defined for a deadline by which a collision is avoidable if the safe action is executed after the rule violation is detected,
wherein, regardless of the instruction from the safety monitoring device, the mobile body is configured to decelerate based on a wireless communication speed of the mobile body with the safety monitoring device being greater than or equal to a prescribed threshold, wherein the rule violation detection unit, when predicting that another mobile body or the pedestrian exists around the mobile body, detects a violation of work prohibition when a person is close, and the safe action instruction unit issues the instruction to the mobile body to perform a safe stop based on the prediction.

2. The traffic control system according to claim 1, wherein when there is a plurality of the mobile bodies within the field, the safe action instruction unit issues an instruction to the mobile body that has violated a rule or the mobile body that obeys the rule to execute the safe action or the safe action preparation.

3. The traffic control system according to claim 2, wherein the safe action instruction unit selects a target to which the instruction is given depending on whether or not the mobile body can be controlled.

4. The traffic control system according to claim 1, wherein when the field is not within a certain distance in a traveling direction and a mounted sensor detects no other mobile body, the mobile body is configured to be controlled without a speed limitation, provided that the wireless communication speed is less than the threshold.

5. The control system according to claim 1, wherein when the field is not within a certain distance in a traveling direction and a mounted sensor detects another mobile body, the mobile body is configured to be decelerated to a speed at which a collision with the detected other mobile body can be avoided on a basis of a distance to the detected other mobile body, provided that the wireless communication speed is less than the threshold.

6. The traffic control system according to claim 1, wherein the mobile body is configured to select a command having a greatest deceleration degree from among input control commands.

7. The traffic control system according to claim 1, wherein the rule violation detection unit predicts an action of the mobile body from a current time to a first time and an action of the mobile body from the first time to a second time, and the safe action instruction unit when the rule violation is predicted to occur between the first time and the second time, issues an instruction to the mobile body on the safe action preparation, and when the rule violation is predicted to occur between the current time and the first time, issues an instruction to start the safe action or the safe action preparation.

8. The traffic control system according to claim 1, wherein the rule violation detection unit, when predicting that positions of two mobile bodies overlap, detects a violation of simultaneous-entry prohibition.

9. The traffic control system according to claim 1, wherein the rule violation detection unit, when predicting that a position of the mobile body overlaps with a no-parking area, detects a violation of parking prohibition.

10. A traffic control method comprising:

a step of monitoring, by an infrastructure sensor, a mobile body and a pedestrian within a field, including monitoring the pedestrian in a blind spot of the mobile body;

a step of detecting, by a safety monitoring device, on a basis of output from the infrastructure sensor, a rule violation by the mobile body or the pedestrian within the field, the rule violation being determined based on public traffic regulations and custom traffic rules on a private property;

a step of issuing, by the safety monitoring device, an instruction to the mobile body on a safe action or safe action preparation corresponding to the rule violation, based on a determination of whether a difference between a time stamp, received by the safety monitoring device from the mobile body as part of a measurement packet, and a current time is less than a time threshold defined for a deadline by which a collision is avoidable if the safe action is executed after the rule violation is detected;

a step of evaluating, by the mobile body, a wireless communication speed between the mobile body and the safety monitoring device; and a step of generating and outputting, by the mobile body, regardless of the instruction, a control command for decelerating the mobile body, provided that the wireless communication speed is greater than or equal to a prescribed threshold;

wherein the safety monitoring device, when predicting that another mobile body or the pedestrian exists around the mobile body, detects a violation of work prohibition when a person is close, and issues the instruction to the mobile body to perform a safe stop based on the prediction.

* * * * *